United States Patent [19]

Fukushima

[11] 4,385,249

[45] May 24, 1983

[54] FLAT CORELESS MOTOR WITH TACHOGENERATOR

[75] Inventor: Yasuhiro Fukushima, Tokyo, Japan

[73] Assignee: Kabushiki Kaisha Daini Seikosha, Tokyo, Japan

[21] Appl. No.: 213,618

[22] Filed: Dec. 5, 1980

[30] Foreign Application Priority Data

Dec. 21, 1979 [JP] Japan .............................. 54-167139

[51] Int. Cl.³ .......................................... H02K 11/00
[52] U.S. Cl. .................................. 310/68 R; 310/268; 310/156; 310/113
[58] Field of Search ...................... 310/268, 113, 68 R, 310/263, 156, 257, 112, 89, 90

[56] References Cited

U.S. PATENT DOCUMENTS

| | | | |
|---|---|---|---|
| 3,646,376 | 2/1972 | Anderson | 310/263 X |
| 3,868,521 | 2/1975 | Schlicker et al. | 310/257 |
| 4,079,277 | 3/1978 | Osanai | 310/268 X |
| 4,093,882 | 6/1978 | Furuta | 310/268 |
| 4,174,484 | 11/1979 | Schmider | 310/268 X |
| 4,237,394 | 12/1980 | Aoki | 310/268 X |

*Primary Examiner*—Donovan F. Duggan
*Attorney, Agent, or Firm*—Robert E. Burns; Emmanuel J. Lobato; Bruce L. Adams

[57] ABSTRACT

A flat coreless motor and tachogenerator assembly comprises a rotary motor comprised of a disk-shaped rotor having a plurality of coreless coils, a shaft connected to the rotor, a stator magnet magnetically coupled to the rotor, and a housing containing therein the rotor and stator magnet. The shaft is rotatably supported at one end by a bearing holder which has a closed end portion and a tubular portion extending from the closed end portion into the housing. A bearing disposed within the closed end portion of the bearing holder rotatably mounts the end of the shaft. A tachogenerator is disposed between the motor and the bearing and comprises a tachogenerator rotor connected to the shaft and positioned within the interior of the bearing holder tubular portion, and a tachogenerator stator disposed within the interior of the bearing holder tubular portion in spaced-apart magnetically coupled relationship with respect to the tachogenerator rotor.

8 Claims, 5 Drawing Figures

FLAT CORELESS MOTOR WITH TACHOGENERATOR

BACKGROUND OF THE INVENTION

The present invention relates to a flat coreless motor with a tachogenerator, and more particularly to a mounting technique and a tachogenerator construction for incorporating the tachogenerator into the motor body.

Conventionally, it is difficult to incorporate a tachogenerator into a small-sized flat coreless motor because of its structure, so the tachogenerator is usually provided outside of the motor body by extending the rotor shaft of the motor out of the motor body. According to this technique, however, the thickness of the flat and thin motor increases due to the presence of the tachogenerator thereby making this technique disadvantageous.

Accordingly, it is an object of the present invention to eliminate the above noted drawbacks and to incorporate a tachogenerator into a motor body by incorporating a stator of the tachogenerator into a bearing holder of the motor shaft and by using a micro multi-polar tachogenerator rotor comprised of an anisotropic magnet and a pair of upper and lower rotor yokes made of soft magnetic material having plural comb-shaped poles.

DESCRIPTION OF PRIOR ART

FIG. 1 shows a sectional view of the conventional construction, in which a tachogenerator is mounted to the outside of a flat coreless motor. A rotor shaft 1 of the motor projects from a bracket 4 of a motor bottom portion, and a disk-shaped tachogenerator rotor 14 made of an isotropic magnet magnetized multipolarly around its outer periphery is fixed to the rotor shaft 1. A tachogenerator stator 15 extends around the outer periphery of the tachogenerator rotor 14 and is fixed to the bracket 4. A tachogenerator coil 16 is wound on the stator 15 and is connected to lead wires 17. Thus the tachogenerator projects from the motor body such that the thickness of the motor is increased by an amount approximately equal to the thickness of the tachogenerator.

The conventional motor-tachogenerator structure shown in FIG. 1 includes bearings 2 and 5 for rotatably mounting the motor shaft 1 to a cup-shaped motor housing 3 and the bracket 4, respectively. The motor includes a coreless coil 6 attached to a coil frame 7, a varistor 8 and a balance ring 9 secured to the outer periphery of the coil 6. A commutator 10 coacts with brushes 12 mounted on a brush frame 11 to control the direction of current fed through lead wires 13 to the coil 6.

DETAILED DESCRIPTION OF PREFERRED EMBODIMENT

Figure 1:
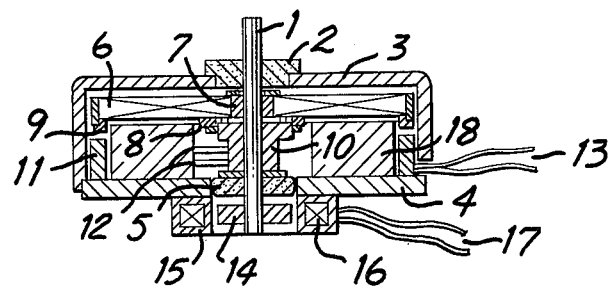
FIG. 1 is a sectional view showing an embodiment in which a tachogenerator is mounted on the conventional flat coreless motor.
Figure 2:
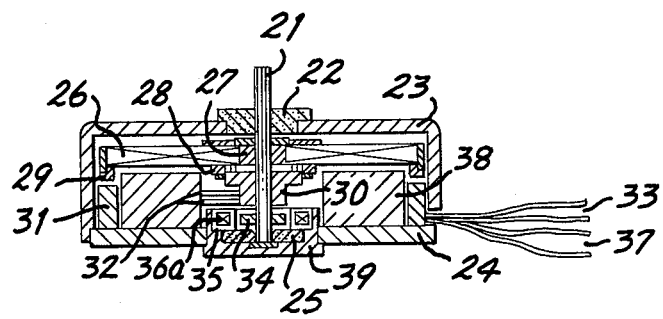
FIG. 2 is a sectional view showing an embodiment of the present invention.

FIG. 2 shows a sectional view of one embodiment according to the present invention in which the tachogenerator is incorporated into the motor body. A coreless coil 26 having a generally disk shape, is attached to a coil frame 27 and a balance ring 29 is secured to the outer periphery of the coil 26. A commutator 30 and a tachogenerator rotor 34 are fixed to a rotor shaft 21 below the coreless coil 26 to constitute a motor rotor. The commutator 30 coacts with brushes 32 mounted on a brush frame 31 to control the direction of current through motor lead wires 38 to the motor coil 26. A bearing 22 for rotatably supporting the rotor shaft 21 near one end is fixed to a cup-shaped housing 23, and a bearing 25 for rotatably supporting the other end of the rotor shaft 21 and a bearing holder 39 for supporting a stator magnet 38 are fixed to a bracket 24. The bearing holder 39 extends into the interior of the motor body and has a sleeve shape, and a tachogenerator stator comprised of a tachogenerator coil 36a and a tachogenerator stator yoke 35 are encased in the sleeve interior of the bearing holder 39. The tachogenerator stator yoke 35 has a toroidal or doughnut shape with a hollow center portion, and an inner peripheral face of the yoke 35 and an outer peripheral face of the tachogenerator rotor 34 are spaced apart and face each other with an air gap therebetween.

Figure 3:
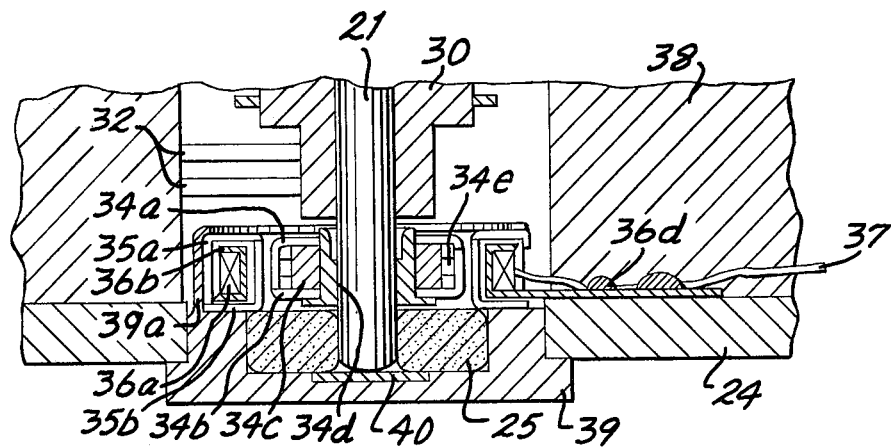
FIG. 3 is an expanded view of the tachogenerator shown in FIG. 2.
Figure 4:
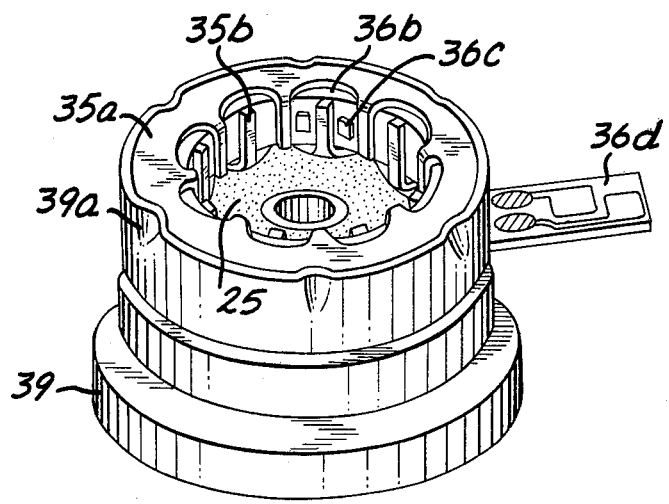
FIG. 4 is a perspective view showing the tachogenerator stator encased in a bearing holder.
Figure 5:
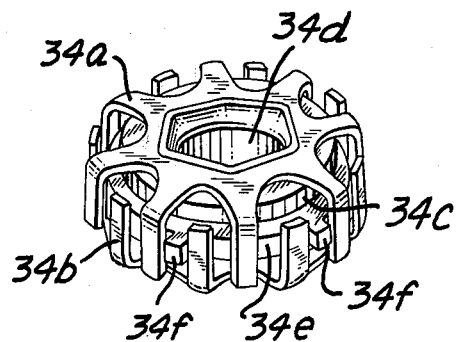
FIG. 5 is a perspective view of the tachogenerator rotor.

FIG. 3 shows an enlarged sectional view of the tachogenerator portion in FIG. 2, FIG. 4 shows a perspective view in of the tachogenerator stator encased in the bearing holder 39, and FIG. 5 shows a perspective view of the tachogenerator rotor. The tachogenerator stator comprises upper and lower yokes 35a and 35b made of soft magnetic material having plural comb-shaped poles and a tachogenerator coil frame 36b made of resin on which is wound a tachogenerator coil 36a. These elements are caulked at the tip of a sleeve portion 39a of the bearing holder 39.

The tachogenerator coil frame 36b is of the doughnut shape a channel shaped or    shaped section and at the inner periphery thereof are provided two or more protruding convex portions 36c which are alternately interposed between the comb-shaped poles of the yoke 35a and the yoke 35b of fixed intervals. The terminals of the tachogenerator coil 3a are connected to tachogenerator lead wires 37 through a circuit board 36d as shown in FIGS. 3 and 4.

The tachogenerator rotor comprises a ring-shaped magnet 34c made of a ferrite system or a rare earth element system and being anisotropic in the thickness direction, tachogenerator rotor yokes 34a and 34b made of a soft magnetic material having comb-shaped poles of the same number as that of the tachogenerator stator yokes, a rotor yoke spacer 34e and a rotor bush 34d. The tachogenerator rotor yokes 34a and 34b sandwich the magnet 34c in the thickness direction, and at the outer periphery of the magnet is provided the ring-shaped rotor yoke spacer 34e are provided. At the outer periphery of the spacer 34e two or more protruding convex portions 34f interposed between the comb-shaped poles of the tachogenerator rotor yokes 34a and 34b to hold the poles fixed intervals with respect to one another. The magnet 34c and the tachogenerator rotor yokes 34a and 34b are caulked by the rotor bush 34d and driven into the rotor shaft 21 thereby fixedly connecting the tachogenerator rotor to the shaft.

According to the present invention, the entire tachogenerator is exceedingly small sized and the assembling is simplified by realizing a micro multipolar rotor of approximately 3 mm diameter by employing the anisotropic magnet and the plural comb-shaped yokes, by mounting the tachogenerator stator on the sleeve portion of the bearing holder and by providing the convex portions at the tachogenerator coil frame. Consequently the present invention enables the tachogenerator to be incorporated into the flat coreless motor structure thereby reducing the overall thickness as compared to prior art constructions.

What is claimed:

1. A flat coreless motor and tachogenerator assembly comprising: a rotary motor comprised of a disk-shaped rotor having a plurality of coreless coils, a shaft connected to the rotor, a stator magnet magnetically coupled to the rotor, a housing having disposed therein the rotor and stator magnet, and supporting means rotatably supporting the shaft, said supporting means including a bearing holder connected to the housing and having a closed end portion and a tubular portion extending from the closed end portion into the housing, and bearing means disposed within the closed end portion of the bearing holder for rotatably mounting one end of the shaft; and a tachogenerator disposed between the motor and bearing means and comprised of a tachogenerator rotor connected to said shaft for rotation therewith and being positioned within the interior of the bearing holder tubular portion, and a tachogenerator stator disposed within the interior of the bearing holder tubular portion in spaced-apart magnetically coupled relationship with respect to the tachogenerator rotor.

2. An assembly according to claim 1; wherein the tachogenerator rotor and stator are completely disposed within the length of the bearing holder tubular portion.

3. An assembly according to claim 1 wherein the tachogenerator is disposed within said housing.

4. An assembly according to claim 1 wherein the tachogenerator stator comprises a coil frame, a ring-shaped coil wound on the coil frame, and upper and lower yokes sandwiching therebetween the ring-shaped coil and each having a plurality of comb-like poles disposed such that the poles of the upper yokes are alternately disposed with respect to the poles of the lower yoke around the inner side of the ring-shaped coil.

5. An assembly according to claim 4; wherein the tachogenerator stator includes a plurality of projections projecting from the coil frame with each projection extending between an adjoining pair of upper and lower yoke poles to effectively position the upper and lower yokes in a predetermined position with respect to one another.

6. An assembly according to claim 4; wherein the tachogenerator rotor comprises a ring-shaped magnet magnetized anisotropically in the thickness direction, and upper and lower rotor yokes sandwiching therebetween the ring-shaped magnet and each having a plurality of comb-like poles disposed such that the poles of the upper yoke are alternately disposed with respect to the poles of the lower yoke around the outer side of the ring-shaped magnet.

7. An assembly according to claim 6; wherein the tachogenerator rotor includes an annular spacer disposed around the outer side of the ring-shaped magnet spacing the magnet from the upper and lower rotor yokes, and a plurality of projections projecting from the spacer with each projection extending between an adjoining pair of upper and lower rotor yoke poles to effectively position the upper and lower rotor yokes in a predetermined position with respect to one another.

8. An assembly according to claim 6; wherein the ring-shaped magnet is composed of a ferrite system or a rare earth system having an anisotropic magnetic characteristic in the thickness direction.

* * * * *